United States Patent [19]
Schmidt

[11] Patent Number: 5,324,191
[45] Date of Patent: Jun. 28, 1994

[54] SEALED EDGE GATE

[75] Inventor: Harald Schmidt, Georgetown, Canada

[73] Assignee: Husky Injection Molding Systems Ltd., Bolton, Canada

[21] Appl. No.: 954,289

[22] Filed: Sep. 30, 1992

[51] Int. Cl.$^5$ .................................... B29C 45/20
[52] U.S. Cl. ............... 425/549; 264/297.2; 264/328.8; 264/328.15; 425/568; 425/572; 425/588
[58] Field of Search ............ 264/297.2, 328.8, 328.9, 264/328.15; 425/549, 566, 567, 568, 570, 572, 588

[56] References Cited

U.S. PATENT DOCUMENTS

| | | | |
|---|---|---|---|
| 4,094,447 | 6/1978 | Gellert | 425/570 |
| 4,344,750 | 8/1982 | Gellert | 425/548 |
| 4,345,892 | 8/1982 | Schulte et al. | 425/588 |
| 4,412,805 | 11/1983 | Morrison | 425/568 |
| 4,492,555 | 1/1985 | Schulte | 425/549 |
| 4,586,887 | 5/1986 | Gellert | 425/570 |
| 4,663,811 | 5/1987 | Gellert | 425/572 |
| 4,768,283 | 9/1988 | Gellert | 425/572 |
| 4,900,560 | 2/1990 | Trakas | 425/572 |
| 4,981,431 | 1/1991 | Schmidt | 425/549 |
| 5,143,733 | 9/1992 | Von Buren et al. | 264/328.9 |
| 5,217,730 | 6/1993 | Teng | 425/572 |

FOREIGN PATENT DOCUMENTS 2356764  5/1974  Fed. Rep. of Germany ...... 425/572

Primary Examiner—Charles S. Bushey
Attorney, Agent, or Firm—Bachman & Lapointe

[57] ABSTRACT

The present invention relates to a hot runner sealed edge gated injection molding system. The system includes a mold cavity plate with at least one injection gate and a nozzle assembly having a tip end and at least one melt channel for transporting molten plastic material. The system further includes an annular seal ring which fits snugly over the tip end of the nozzle assembly. The seal ring has at least one melt channel and at least one orifice for transporting molten plastic material from the at least one melt channel in the nozzle assembly to the at least one injection gate in the mold cavity plate. In a preferred embodiment, the seal ring is formed from a material having a thermal coefficient of expansion lower than the thermal coefficient of expansion of the material forming the nozzle. As a result, the nozzle when heated will expand at a greater rate than the seal ring resulting in an effective sealing arrangement with the seal ring being pressed against the mold cavity plate and being gripped by the nozzle.

18 Claims, 2 Drawing Sheets

SEALED EDGE GATE

BACKGROUND OF THE INVENTION

The present invention relates to an improved nozzle assembly for an injection molding machine and, more particularly, to an improved sealed edge gate arrangement to be used therein.

Hot runner edge gating systems are well known in the art. When such systems are used to process heat sensitive resins however, it becomes important to minimize or, if possible, eliminate any bubble or resin insulation well so as to avoid degraded resins, trapped within the nozzle assembly and its components, from being drawn into the main melt stream and thereby into the molded part.

U.S. Pat. No. 4,344,750 to Gellert and U.S. Pat. No. 4,981,431 to Schmidt show typical non-bubble type hot runner edge gating systems. The system shown in the Gellert patent uses individual hollow seals to connect the hot runner nozzle directly to the cavity gate. This totally eliminates the bubble because the nozzle is completely surrounded by an insulating air gap. The seals used in this system are pressed into recesses in the nozzle, one seal for each gate. As the nozzle assembly is fitted into the mold cavity plate, the seals deform slightly inwardly so as to effect a mechanical seal with the cavity plate. Removal and replacement of the nozzle for servicing requires the replacement of the seals each time. Another disadvantage of this approach is that the seal is made of titanium, which although having a lower thermal conductivity than steel, still permits a significant amount of heat to be conducted from the heated nozzle to the cooled mold cavity. As a consequence, the nozzle has to be heated to a higher temperature than would otherwise be required to process the resin. Normally this is not detrimental, but when heat sensitive resins are processed, this can be troublesome since these resins easily degrade at temperatures only slightly higher than their processing temperature.

The Schmidt patent also uses individual titanium seals individually screwed into the nozzle assembly. The seal design uses a very small bubble to locally insulate the gate from the nozzle and thereby reduce the heat conducted through the seal. A disadvantage of this design is that the stiffer seal construction is less elastic and does not readily deform during installation like the Gellert seal. This means greater accuracy in manufacture and assembly are required in order to assemble the nozzle. Also, since this seal is larger than the Gellert seal, there is less space in the nozzle to accommodate multiple seals for multiple gating. The most attempted has been four. Additional orifices tend to weaken the nozzle at the tip end where strength is most important. At the tip end, the injected resin travelling at high speed and under high pressure must change direction through ninety degrees subjecting the end of the nozzle to very high stresses. The risk of blowing the end off the nozzle is increased by the addition of seals for multi-cavity gating.

Both of the sealing devices shown in the Gellert and Schmidt patents have the disadvantage that the sealing and the location of the gates is local to each gate. Thus, in a two cavity arrangement, there is a tendency for the nozzle assembly to cock or jam when being assembled or disassembled since alignment and contact with the mold cavity occurs in only two places within the mold cavity location diameter.

Accordingly, it is an object of the present invention to provide an improved sealed edge gate system for an injection molding system.

It is a further object of the present invention to provide an edge gate system as above which facilitates the processing of heat sensitive resins.

It is still a further object of the present invention to provide an edge gate system as above which provides a nozzle assembly having improved thermal insulation properties.

Other objects and advantages of the present invention will become more apparent from the following description and the accompanying drawings in which like reference numerals depict like elements.

SUMMARY OF THE INVENTION

The foregoing objects are attained by the sealed edge gate system of the present invention. In accordance with the present invention, a hot runner sealed edge gated injection molding system comprises a nozzle assembly having a tip end and at least one melt channel extending into the tip end and an annular seal or sealing ring snugly fitted over the tip end of the nozzle assembly. The seal ring has at least one melt channel for mating with the at least one melt channel in the nozzle assembly.

The seal ring of the present invention is further characterized by the presence of one or more orifices which can be aligned with one or more gates in a mold cavity plate and by the presence of two circumferential bubble grooves and a circumferential film groove about its periphery for receiving molten plastic material which acts as a thermal insulator. The seal ring is preferably formed from a material having a lower thermal coefficient of expansion than the material forming the tip end of the nozzle assembly. In this way, a gripping force can be generated on the seal ring when the nozzle assembly and/or the tip end is heated and an effective sealing arrangement can be created between the seal ring and the mold cavity plate.

Still other features of the sealed edge gated injection molding system and the seal ring will be described in the following description.

DETAILED DESCRIPTION

Figure 1:
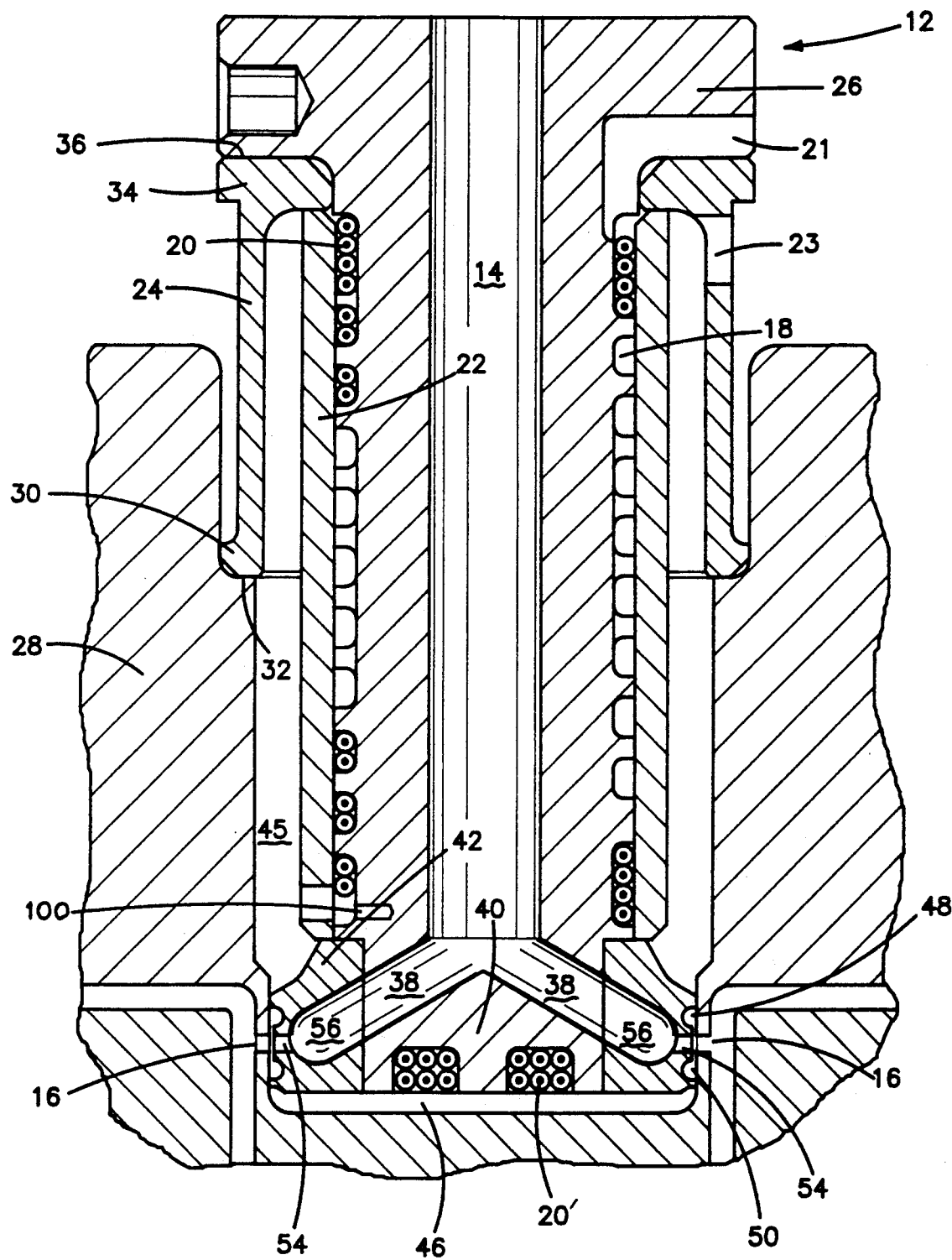
FIG. 1 is a cross sectional view of a nozzle assembly with a sealed edge gate in accordance with the present invention.
Figure 2:
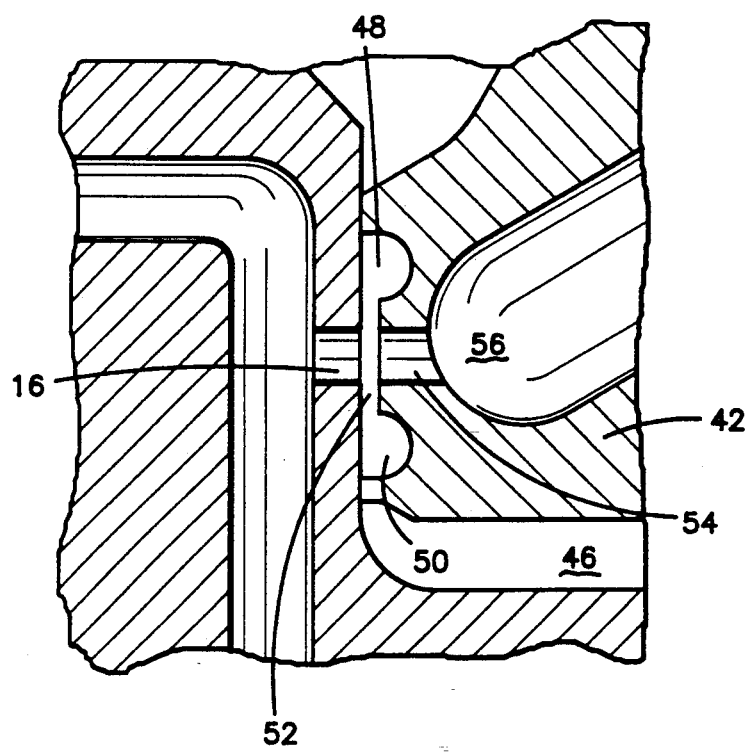
FIG. 2 is an enlarged view of a portion of the nozzle assembly of FIG. 1.

Referring now to the drawings, FIG. 1 illustrates a nozzle assembly for an injection molding system. The nozzle assembly includes a nozzle 12 formed from a thermally conductive material, such as steel or a copper alloy, having a central melt channel 14 through which molten plastic material is transferred from a source (not shown) to one or more injection gates 16 in a mold cavity plate 28. As shown in FIG. 1, the central melt channel 14 can terminate in one or more angled melt channels 38 located in or extending into a tip end 40 of the nozzle 12. It should be recognized that, while only two angled melt channels 38 have been illustrated in FIG. 1, the melt channel 14 could terminate in any desired number of angled melt channels 38 with the number of such angled melt channels generally corresponding to the number of injection gates 16 in the mold cavity plate 28.

As shown in FIG. 1, the nozzle 12 has one or more grooves 18 machined therein and extending along its longitudinal axis for housing a tubular heater 20 which keeps the plastic material within the melt channel 14 in a molten condition. A steel sleeve 22 is provided around a central portion of the nozzle 12 and serves to retain the heater 20 in the groove(s) 18. If desired, a heater 20' may also be housed in a groove in the tip end 40 of the nozzle 12. The heater 20' could be part of the heater 20 or alternatively may be a separate heater. The heater(s) 20, 20' may comprise any suitable heater known in the art.

An annular insulator 24 is preferably positioned between the head 26 of the nozzle 12 and the mold cavity plate 28 to reduce the amount of heat transferred from the nozzle 12 to the mold cavity plate 28. As can be seen from FIG. 1, the insulator 24 surrounds a portion of the sleeve 22. It has a lower end 30 which rests on a surface 32 cut into the mold cavity plate 28 and an upper end 34 abutting a lower surface 36 of the nozzle head 26. The insulator 24 is held in place against the nozzle head by the sleeve 22. Preferably, the insulator is formed from steel, whose thin section 24 limits the flow of heat to the cavity plate.

Access openings 21 and 23 are provided in the nozzle 12 and/or the insulator 24 to permit wiring (not shown) to be connected to the heater(s) 20 and the thermocouple located at 100.

Figure 3:
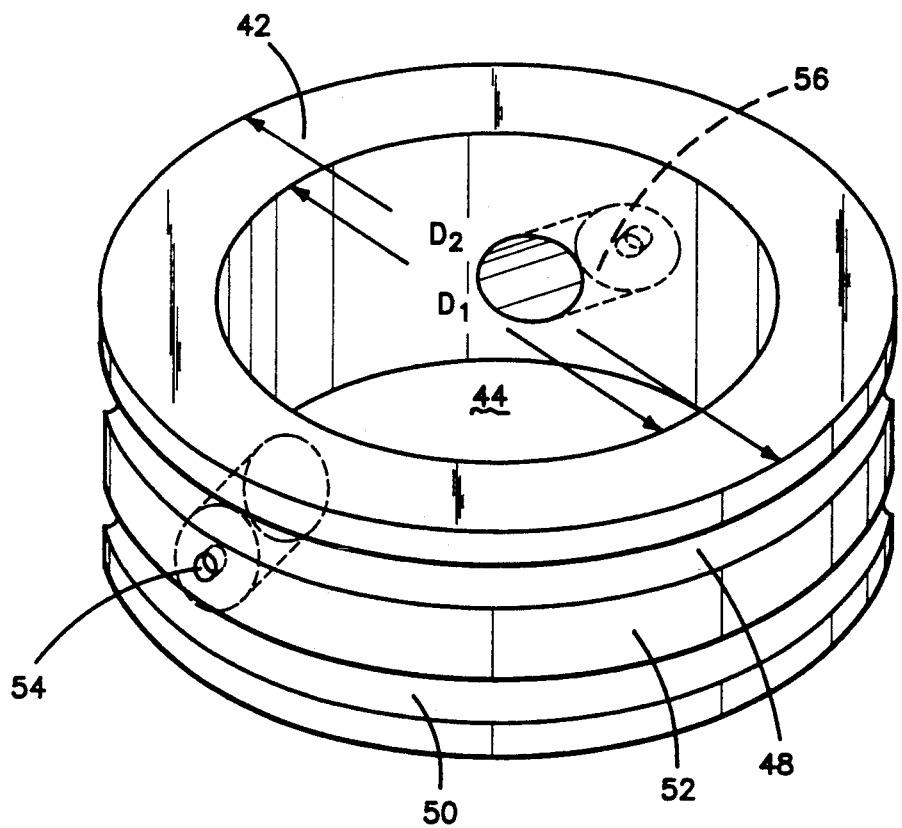
FIG. 3 is a perspective view of a seal ring in accordance with the present invention.

In accordance with the present invention, the nozzle assembly includes an annular seal ring 42 snugly fitted over the tip end 40 of the nozzle 12 and housed within a recess 46 defined by a lower portion of a bore 45 in the mold cavity plate 28. The seal ring, as shown in FIG. 3, is formed by an annular body having a central bore 44 with a diameter $D_1$ which is substantially equal to the outer diameter of the tip end 40 of the nozzle 12. The seal ring also has an outer diameter $D_2$ which substantially corresponds to the diameter of the recess 46. When assembled, the seal ring 42 contacts the wall(s) of the bore defining the recess 46 about its entire periphery and extends about or surrounds the tip end 40 of the nozzle. Since contact between the seal ring and the recess wall(s) is not limited to a few locations, cocking is avoided and easy assembly/disassembly and proper alignment of the nozzle assembly is ensured.

As shown in the drawings, the seal ring 42 has a number of angled melt channels 56 machined therein. These angled melt channels mate with the angled melt channels 38 in the tip end 40 of the nozzle and form passageways which serve to transport molten plastic material from the melt channels 38 to the injection gates 16 in the mold cavity plate. Of course, the number and the location of the angled melt channels 56 in the seal ring corresponds to the number and the location of the angled melt channels 38 in the tip end of the nozzle. In addition to cooperating with a respective melt channel 38, each melt channel 56 is in communication with an orifice 54 drilled into the seal ring 42 which also forms part of the passageway for transporting plastic material. The number of orifices 54 drilled into the seal ring 42 and their locations correspond to the number and the locations of the gates 16 in the mold cavity plate 28. The orifices 54 permit molten plastic material within the channels 56 to flow into the gates 16. It should be recognized that one advantage of the design of the seal ring 42 is that many such orifices can be drilled into the ring about the ring periphery without causing any substantial weakening of the ring. Thus 8, 12 or even 16 small cavity gates can be accommodated from a single nozzle assembly fitted with the seal ring of the present invention.

Preferably, the seal ring 42 is made from a material having a thermal coefficient of expansion lower than the thermal coefficient of expansion of the material forming the nozzle 12. In this way, the nozzle 12 when heated will expand inside the seal ring 42. Since the outer periphery of the seal ring abuts the walls defining the recess 46, expansion of the nozzle will press the seal ring outwardly to seal against the wall(s) of the recess as well as cause a gripping effect on the seal ring 42. As a result, a good seal is formed between the seal ring and the mold cavity plate and between the melt channels 38 and 56 so that leakage of molten plastic material between the nozzle and the seal ring is avoided. In a preferred embodiment of the present invention, the seal ring is formed from titanium (a material having a thermal coefficient of expansion of $5.3 \times 10^{-6}$ in/in/°F.) or a titanium alloy, while the nozzle is formed from steel (a material having a thermal coefficient of expansion of $6.8 \times 10^{-6}$ in/in°F.) or a copper alloy, such as BeCu25 or Ampco 945 having a thermal coefficient of expansion of $9.5 \times 10^{-6}$ in/in/°F.

Two circumferential bubble grooves 48 and 50 and a circumferential film groove 52 are machined into the seal ring 42. The grooves 48, 50 and 52 extend about the entire periphery of the seal ring with the film groove 52 extending between the bubble grooves 48 and 50. In operation, at least some of the molten plastic material injected into the gates 16 via the angled melt channels 56 and the orifices 54 will initially fill the circumferential film and bubble grooves 48, 50 and 52 because the orifices 54 are in communication with the grooves. This plastic material acts as a thermal insulator. As a result, there is a minimization of the heat transferred via the seal ring 42 to the mold cavity plate 28.

It has been found that by using the seal ring of the present invention, there is no bleeding of the insulating plastic material into the main melt stream flowing through the orifices 54 and the gates 16. Thus, the sealed edge gate system of the present invention has particular utility in the processing of heat sensitive resins where degradation and contamination of the resin needs to be avoided. The sealed edge gate system of the present invention is also advantageous in that the improved thermal insulation properties obtained thereby mean that the nozzle heater 20 need not be operated unnecessarily high in order to overcome heat losses.

The design of the seal ring 42 is most advantageous in that when frequent color change or change of resin is required it maintains strength integrity and allows easy assembly/disassembly. Still further, the design provides an ability to offer more gates per nozzle which is an important benefit.

While the seal ring 42 has been illustrated as having an annular configuration, it should be recognized that the seal ring could have any desired configuration or shape.

It is apparent that there has been provided in accordance with this invention a sealed edge gate which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A hot runner sealed edge gated injection molding system comprising:
   a nozzle being formed from a thermally conductive material and having a tip end and at least one melt channel for transporting molten plastic material;
   a seal ring surrounding said tip end of said nozzle having at least one melt channel mating with said melt channel in said nozzle;
   said seal ring having an inner wall defining a space into which said tip end of said nozzle is inserted, said inner wall being sized so that said seal ring fits snugly over said tip end of said nozzle; and
   said seal ring being formed from a material having a different thermal coefficient of expansion than the thermally conductive material forming said nozzle;
   whereby expansion of said nozzle during heating causes said tip end of said nozzle to press against the inner wall of said seal ring and create a seal against the leakage of molten material between the nozzle and the seal ring.

2. The injection molding system of claim 1 further comprising:
   said at least one melt channel in said nozzle comprising a central melt channel and at least one angled melt channel located within said tip end, said at least one angled channel communicating with said central melt channel; and
   said at least one mating melt channel in said seal ring having at least one angled melt channel mating with said angled melt channel in said tip end.

3. The injection molding system of claim 2 further comprising:
   said nozzle having at least two angled melt channels located within said tip end in communication with said central melt channel; and
   said seal ring having at least two angled melt channels for mating with said at least two angled melt channels in said tip end.

4. The injection molding system of claim 1 further comprising:
   a mold cavity plate having at least one injection gate; and
   said seal ring having at least one orifice communicating with said at least one injection gate for enabling molten plastic material in said at least one melt channel in said nozzle to be transported to said at least one injection gate.

5. The injection molding system of claim 4 further comprising:
   said mold cavity plate having a number of injection gates; and
   said seal ring having a number of orifices drilled therein about its periphery, said number of orifices being equal to said number of injection gates with each respective orifice mating with one of said injection gates.

6. The injection molding system of claim 1 further comprising:
   a mold cavity plate; and
   said seal ring being in contact with said mold cavity plate and having means for minimizing heat transferred from said seal ring to said mold plate.

7. The injection molding system of claim 6 wherein said heat minimizing means comprises two bubble grooves and a film groove machined into said seal ring, said grooves being filled by plastic material acting as a thermal insulator.

8. The injection molding system of claim 1 further comprising:
   a mold cavity plate;
   said mold cavity plate including a recess having a diameter;
   said seal ring being located within said recess and being in contact with at least one wall defining said recess; and
   said seal ring having an outer diameter substantially equal to said diameter of said recess,
   whereby expansion of said nozzle due to heating presses said seal ring outwardly to seal against said at least one wall defining said recess.

9. The injection molding system of claim 1 further comprising:
   at least one groove extending along said nozzle; and
   at least one heater positioned within said at least one groove to maintain said plastic material in said melt channels in a molten condition.

10. The injection molding system of claim 9 further comprising:
    a sleeve surrounding a portion of said nozzle and serving to hold said at least one heater in position;
    an annular insulator surrounding a portion of said sleeve, said insulator having a lower edge contacting said mold cavity plate and an upper edge contacting said nozzle; and
    said insulator being held in place by said sleeve.

11. The injection molding system of claim 1 wherein said nozzle is formed from steel or a copper alloy and said seal ring is formed from titanium or a titanium alloy.

12. A sealed edge gate for use in an injection molding machine, said sealed edge gate comprising:
    a mold cavity plate having at least one injection gate;
    a nozzle having at least one melt channel for transporting molten material;
    an annular seal ring surrounding a portion of said nozzle, said seal ring having at least one passageway for transporting said molten material from said at least one melt channel to said at least one injection gate;
    said seal ring having two spaced, apart bubble grooves in its outer wall and a film groove positioned in said outer wall intermediate and communicating with said bubble grooves; and
    said bubble grooves and film groove being filled with said molten material which acts as an insulator to minimize the transfer of heat from the seal ring to the mold cavity plate.

13. The sealed edge gate of claim 12 wherein said at least one passageway includes at least one melt channel within said seal ring and at least one orifice in said seal ring communicating with said at least one angled melt channel within said seal ring.

14. The sealed edge gate of claim 12 wherein said film groove extends between said bubble grooves.

15. A sealed edge gate for use in an injection molding system, said sealed edge gate comprising:

a mold cavity plate having a plurality of injection gates;

a nozzle having a central melt channel for transporting molten plastic material, said melt channel terminating in a plurality of angled melt channels;

a seal ring extending about a tip end of said nozzle, said seal ring having a plurality of melt channels mating with said angled melt channels in said nozzle and a plurality of orifices about its periphery;

each said orifice being in communication with a respective one of said injection gates and a respective one of said melt channels in said seal ring so as to enable molten plastic material in said nozzle to be transported to said respective one injection gate;

said nozzle being formed from a thermally conductive material;

said seal ring abutting against said mold cavity plate; and said seal ring being formed from a material having a lower thermal coefficient of expansion than the material forming said nozzle, whereby said nozzle material expands at a greater rate than said seal ring material when said nozzle is heated and thereby presses said seal ring against said mold cavity plate to create a sealing effect and creates a gripping effect on said seal ring so as to substantially prevent leakage of plastic material between said nozzle and said seal ring.

16. A seal ring for use in an injection molding system having a nozzle for transporting molten plastic material to an injection gate in a mold cavity plate, said seal ring comprising:

an annular body having at least one melt channel and at least one orifice communicating with said at least one melt channel;

said annular body having a central bore with a diameter which allows said seal ring to be fitted about a portion of said nozzle;

said annular body being formed from a material having a different coefficient of expansion than the material forming said nozzle; and said annular body including means for reducing heat transfer between said seal ring and said mold cavity plate machined into an outer wall of said body.

17. The seal ring of claim 16 further comprising:

a plurality of orifices spaced about said seal ring; and a plurality of melt channels within said annular body, each melt channel communicating with one of said orifices.

18. A sealed edge gate for use in an injection molding machine, said sealed edge gate comprising:

a mold cavity plate having at least one injection gate;

a nozzle having at least one melt channel for transporting molten material;

an annular seal ring surrounding a portion of said nozzle, said seal ring having at least one passageway for transporting said molten material from said at least one melt channel to said at least one injection gate; and said seal ring having at least one groove in its outer wall, said at least one groove being filled with said molten material which acts as an insulator to minimize the transfer of heat from the seal ring to the mold cavity plate.

* * * * *